Figure 4:
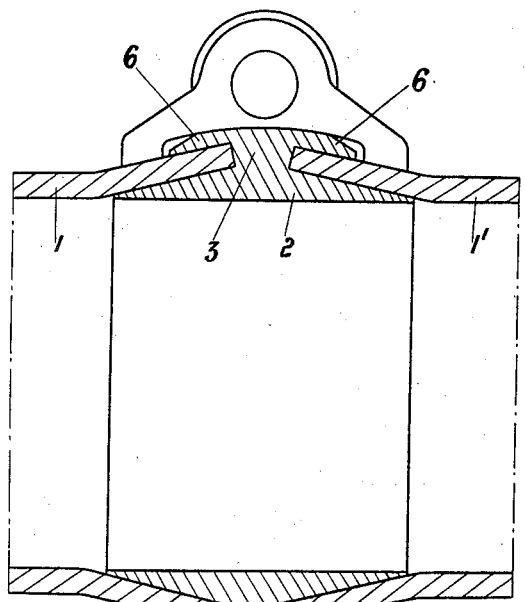

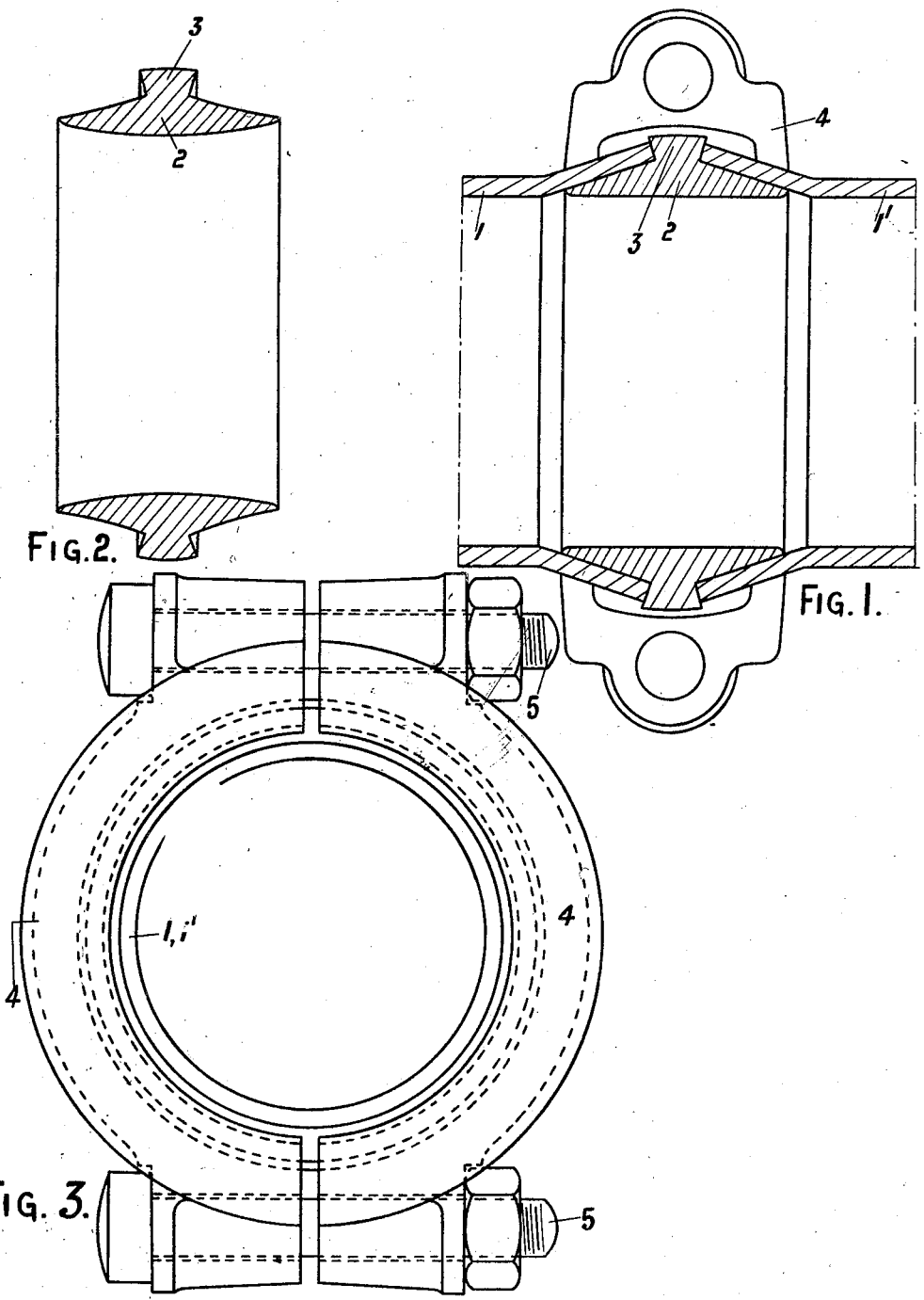

Sept. 6, 1932.　　　G. R. INSHAW　　　1,876,455
PIPE JOINT AND THE LIKE
Filed Jan. 14, 1931　　2 Sheets-Sheet 2

Patented Sept. 6, 1932

1,876,455

UNITED STATES PATENT OFFICE

GEORGE RICHARD INSHAW, OF GLASGOW, SCOTLAND

PIPE JOINT AND THE LIKE

Application filed January 14, 1931, Serial No. 508,626, and in Great Britain January 28, 1930.

My invention relates to improvements in pipe joints and the like, of the type incorporating a flexible ring interposed between the adjacent ends of the pipes or the like to be joined and adapted to be deflected by the fluid pressure so as to make a leakproof seal.

This invention provides a simple joint which can be more readily applied to the pipe ends and is also less costly to manufacture than known joints.

According to my invention the adjacent ends of the pipes to be joined are coned or expanded, e. g., to constitute spherical segments, making the extreme ends of larger diameter than the normal diameter of the pipes. The double conical or conoidal recess formed when the two pipe ends are in position for joining is adapted to receive a ring of rubber or other flexible material, the ring extending approximately the full length of the said recess.

The inner diameter of the said flexible ring is substantially the same as the internal diameter of the pipes to be joined, while its outer face is of double conical or conoidal shape conforming to the said recess.

The flexible ring in its moulded form does not exactly conform to the coned ends of the pipes but its inner wall is convexly arched and its outer edges are of slightly larger diameter than the parts of the coned ends of the pipes on which they are intended to bear when the joint is assembled, so that on placing the flexible ring in position its outer edges may be caused to contract and the flexible ring will then conform substantially to the coned or conoidal ends of the pipes and will present a cylindrical passageway coaxial with the pipe bores.

In order that the flexible ring may be symmetrically located in relation to the pipe ends I provide it with a circumferential projection or ridge at or about mid-way of its length, the said circumferential projection butting against the ends of the pipes which are sufficiently separated for this purpose.

In order to prevent endwise displacement of the pipes I employ two or more semi-circular or arcuate housings which when held together by means of bolts will form a hollow annulus the inner edges of which embrace the conical or conoidal outer surfaces of the pipes. Alternately, the ends of the pipes may be flanged, in addition to being coned, so that the housings will embrace the two flanges and thereby prevent the endwise displacement of the pipes.

As the housings do not hold the pipe ends rigidly, a pipe line provided with joints as described will be slightly flexible.

When it is necessary to provide a joint which will be leakproof from both inside and outside pressures I may provide the flexible rings with an additional lip or band moulded on the said circumferential projection, the additional lip or band being adapted to extend over the outer sides of the coned ends of the pipes so that pressure from the outside will cause the said additional lip or band to press tightly on the outside of the pipes and thereby prevent leakage.

Or the hollow annulus may be contractible to such an extent as by tightening the bolts connecting the segmental housing as to force the adjacent ends of the pipes closer together, compressing the circumferential ridge or projection sufficiently to make the joint leakproof against outside pressures. As the circumferential ridge or projection conforms to the pipe ends, its side faces being normal to the coned ends of the pipes, the circumferential ridge is of maximum width at its extreme outside diameter, so that tendency to force the ridge inwards will set up further compression between the pipe ends and add to the efficiency of the joint.

In order to prevent damage to the circumferential ridge which might result from heavy pressure due to the weight of the pipes when erected, I may form each of the pipe ends with a collar or annular corrugation adapted to bear on the adjacent side of the housings so that any extensive crushing effort will be borne by the housings.

Figure 5:
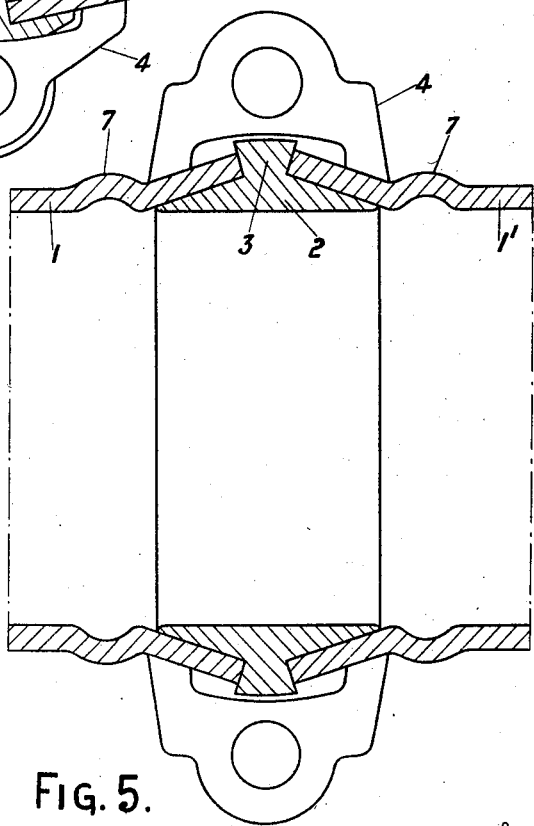

In the accompanying drawings Fig. 1 is an axial section of a pipe joint embodying the invention, Fig. 2 is a detail view of the flexible ring in its moulded form. Fig. 3 is a view at right angles to Fig. 1. Figs. 4 and 5 are axial sections showing modified forms of the joint.

As shown in Figs. 1, 4 and 5 the adjacent ends of two pipes 1, 1' to be joined are coned, so that when the pipe ends are brought together there is formed a double conical recess in which is received a ring 2 of rubber or other flexible material, the ring extending approximately the full length of the recess.

The inner diameter of the ring 2 is substantially the same as the internal diameter of the pipes to be joined, while its outer face is of double conical shape conforming to the recess.

As shown in Fig. 2, the flexible ring in its moulded form does not exactly conform to the coned ends of the pipes but its inner wall is convexly arched and its outer edges are of slightly larger diameter than the coned pipe ends on which they are intended to bear when the joint is assembled, so that on placing the ring 2 in position its outer edges may be caused to contract and the flexible ring will then conform substantially to the coned pipe ends and will present a cylindrical passageway coaxial with the pipe bores.

In order that the ring 2 may be symmetrically located in relation to the pipe ends I provide it with a circumferential ridge or projection 3 at or about mid-way of its length, the said circumferential ridge 3 butting against the ends of the pipes which are sufficiently separated for this purpose.

In order to prevent endwise displacement of the pipes I employ two (or more) housings 4 which, when held together by means of bolts 5, form a hollow annulus the inner edges of which embrace the conical outer surfaces of the pipes.

When it is necessary to provide a joint which will be leakproof from both inside and outside pressures I may provide the flexible ring with an additional lip or band 6 moulded on the circumferential ridge 3 as shown in Fig. 4, the additional lip or band 6 being adapted to extend over the outer faces of the coned ends of the pipes 1, 1' so that pressure from the outside will cause the lip or band 6 to press tightly on the outside of the pipes and thereby prevent leakage.

Or as will be seen from Fig. 3 the hollow annulus may be contractible to such an extent by tightening the bolts 5 connecting the segmental housings as to force the adjacent ends of the pipes closer together, compressing the circumferential ridge or projection 3 sufficiently to make the joint leakproof against outside pressures. As the circumferential ridge 3 conforms to the pipe ends, its side faces being normal to the coned ends of the pipes, the circumferential projection is of maximum width at its extreme outside diameter, so that any tendency to force the ridge inwards will set up further compression between the pipe ends and add to the efficiency of the joint.

In order to prevent damage to the circumferential ridge 3 which might result from heavy pressure due to the weight of the pipes when erected, I may form each of the pipe ends with a collar or annular corrugation 7 adapted to bear on the adjacent side of the housings as shown in Fig. 5 so that any extensive crushing effort will be borne by the housings.

I claim:

1. A flexible pipe joint sealed by fluid pressure, comprising two registering pipe pieces coned at their adjacent ends to constitute a double-conical recess; a one-piece flexible packing ring having externally coned ends received in said recess, the inner face of said ring being exposed to the fluid pressure in said pipe pieces, the inner circumferential surface of said packing ring when in unflexed condition being arched convexly inwardly, the ends of said ring when in unflexed condition being of less conicity than said recess, said ring when in flexed condition mating with said recess and being provided with an external circumferential ridge abutting against the adjacent ends of the pipe-pieces; and internally coned arcuate housings connected together to form a hollow annulus embracing the coned outer faces of said pipe pieces and compressing the coned ends of said pipe pieces on said packing ring, preventing endwise relative displacement of said pipe pieces while permitting flexure of the joint.

2. A flexible pipe joint according to claim 1, in which the packing ring is provided with lips interposed between the outer coned faces of the pipe pieces and the housings and adapted to be pressed against said outer faces under the action of external pressure.

3. A pipe joint according to claim 1, in which each pipe piece is provided with a corrugation at the junction of the coned end with the straight portion of the pipe piece, against which corrugation the housing abuts.

In testimony whereof I have signed my name to this specification.

GEORGE RICHARD INSHAW.